United States Patent [19]
Buti et al.

[11] Patent Number: 5,142,928
[45] Date of Patent: Sep. 1, 1992

[54] AUTOMATIC TRANSMISSION CONTROL SYSTEM FOR CARS COMPRISING A VARIABLE-SPEED DRIVE

[75] Inventors: Luigi B. Buti, Milan; Enrica Fubini, Turin, both of Italy

[73] Assignee: Fiat Auto S.p.A., Turin, Italy

[21] Appl. No.: 655,509

[22] Filed: Feb. 15, 1991

[30] Foreign Application Priority Data

Feb. 16, 1990 [IT] Italy ................. 67114 A/90

[51] Int. Cl.⁵ ............................................. F16H 59/06
[52] U.S. Cl. ................................... 74/335; 74/473 R
[58] Field of Search ............. 74/335, 866, 524, 473 R

[56] References Cited

U.S. PATENT DOCUMENTS

| | | | |
|---|---|---|---|
| 3,597,991 | 8/1971 | McCormick, Jr. et al. | 74/476 |
| 4,660,430 | 4/1987 | Bortfeld et al. | 74/335 |
| 4,912,997 | 4/1990 | Malcolm | 74/335 |
| 4,964,317 | 10/1990 | Murano et al. | 74/844 |
| 4,966,044 | 10/1990 | Bowman et al. | 74/335 |

FOREIGN PATENT DOCUMENTS 0265035 4/1987 European Pat. Off. .
2636396 2/1988 France .
WOA8906395 7/1989 PCT Int'l Appl. .

OTHER PUBLICATIONS

Patents Abstract of Japan, vol. 5, No. 47 (M-61) (719), Mar. 28, 1981.

*Primary Examiner*—Dwight Diehl
*Attorney, Agent, or Firm*—Shlesinger Arkwright & Garvey

[57] ABSTRACT

A variable-speed drive is activated by an actuator controlled by an electronic control system on the basis of engine and vehicle operating parameters. The control system according to the present invention is characterized by the fact that it comprises an actuating member located and operated manually on the gear lever; a detector for detecting the position of the actuating member and generating electric signals proportional to the same; and at least an electric circuit for generating electric signals for controlling and setting the actuator to predetermined positions corresponding to velocity ratios of the variable-speed drive proportional to the aforementioned electric control signals.

9 Claims, 2 Drawing Sheets

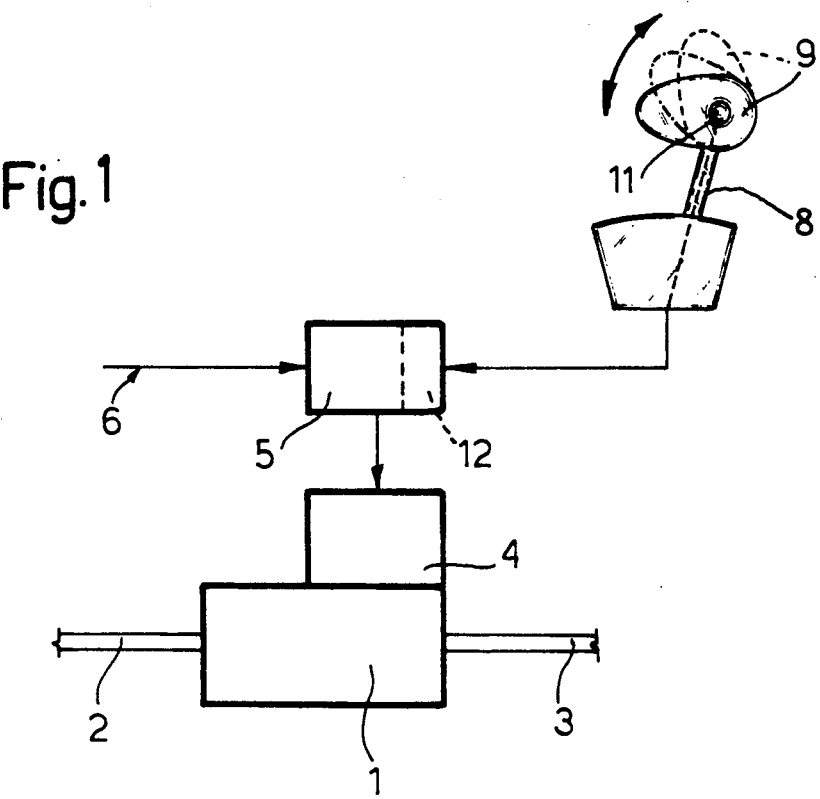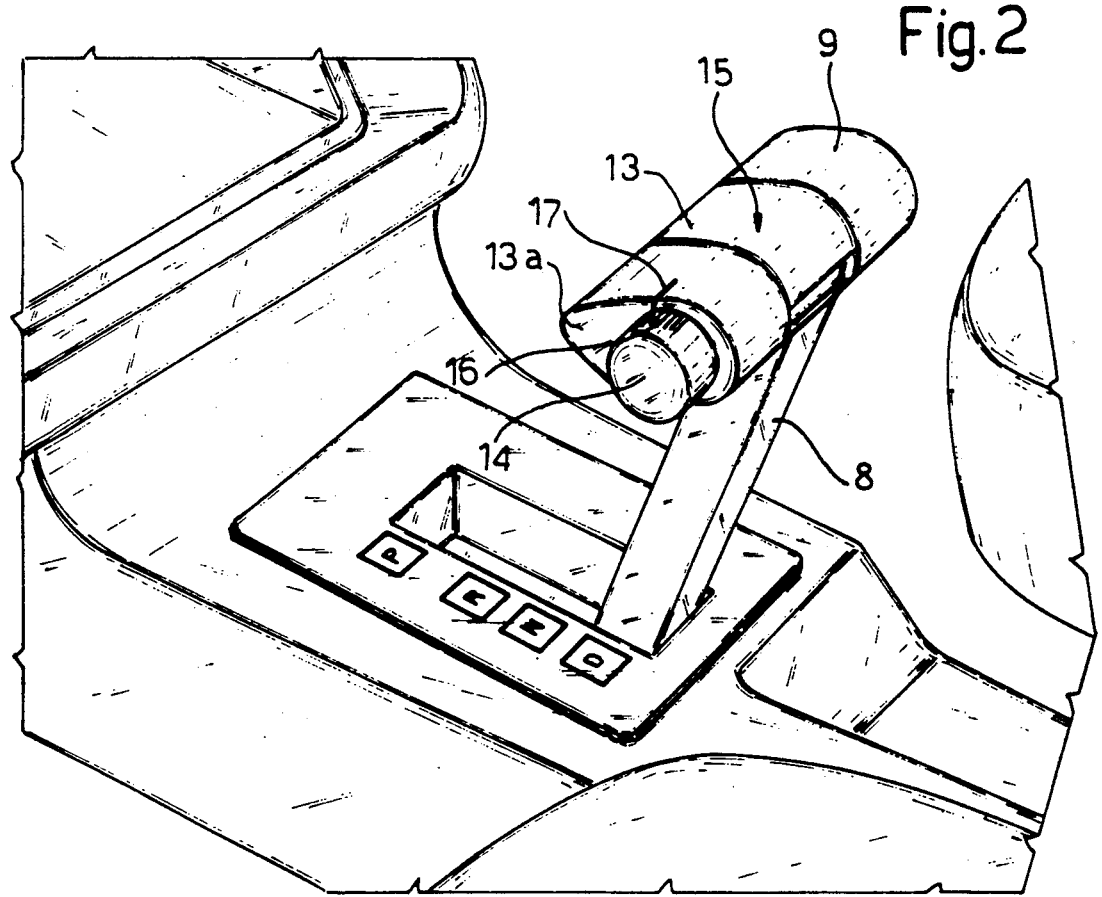

AUTOMATIC TRANSMISSION CONTROL SYSTEM FOR CARS COMPRISING A VARIABLE-SPEED DRIVE

BACKGROUND OF THE INVENTION

The present invention relates to an automatic transmission control system for cars comprising a variable-speed drive enabling the velocity ratio of an input and output shaft to be varied continuously. On transmissions of the aforementioned type, the variable-speed drive is normally operated by an actuator controlled by an electronic control system on the basis of engine and vehicle operating parameters. It also includes a gear lever with a number of settings, at least one of which enables the actuator to receive electric signals from the control system for activating the variable-speed drive. When the gear lever is so set, the velocity ratio best suited to the operating conditions of the engine and the vehicle is selected automatically according to the strategy memorised on the electronic control system, with no possibility of it being modified directly by the driver of the vehicle. Transmissions of the type briefly described above present a number of drawbacks.

Foremost of these is that, under certain driving conditions, the velocity ratio selected by the variable-speed drive may not always provide for optimum vehicle performance and consumption. Moreover, engine braking is ineffective, due to the time required to achieve a substantial reduction in the velocity ratio.

SUMMARY OF THE INVENTION

The aim of the present invention is to provide a control system for an automatic transmission of the aforementioned type, designed to overcome the aforementioned drawbacks, i.e. which provides for optimum vehicle performance and consumption, as well as for effective engine braking via direct intervention on the part of the driver.

With this aim in view, according to the present invention, there is provided an automatic transmission control system for cars comprising a variable-speed drive enabling the velocity ratio of an input shaft and an output shaft to be varied continuously; said drive being activated by an actuator controlled by an electronic control system on the basis of engine and vehicle operating parameters; and said transmission also comprising a gear lever with a number of settings, at least one of which enables said actuator to receive electric signals from said control system for activating said variable-speed drive; characterised by the fact that it comprises an actuating member located and operated manually on said gear lever; a detector for detecting the setting of said actuating member and generating electric signals proportional to the same; and at least an electric circuit for generating electric signals for controlling and setting said actuator to predetermined positions corresponding to velocity ratios of said variable-speed drive proportional to said electric control signals.

BRIEF DESCRIPTION OF THE DRAWINGS

The control system according to the present invention will be described, by way of example, with reference to the accompanying drawings, in which:

FIG. 1 shows a schematic view of the main components of an automatic car transmission featuring the control system according to the present invention;

FIGS. 2 and 3 show views in perspective of the gear lever in two different operating positions;

DETAILED DESCRIPTION OF THE INVENTION

Figure 3:
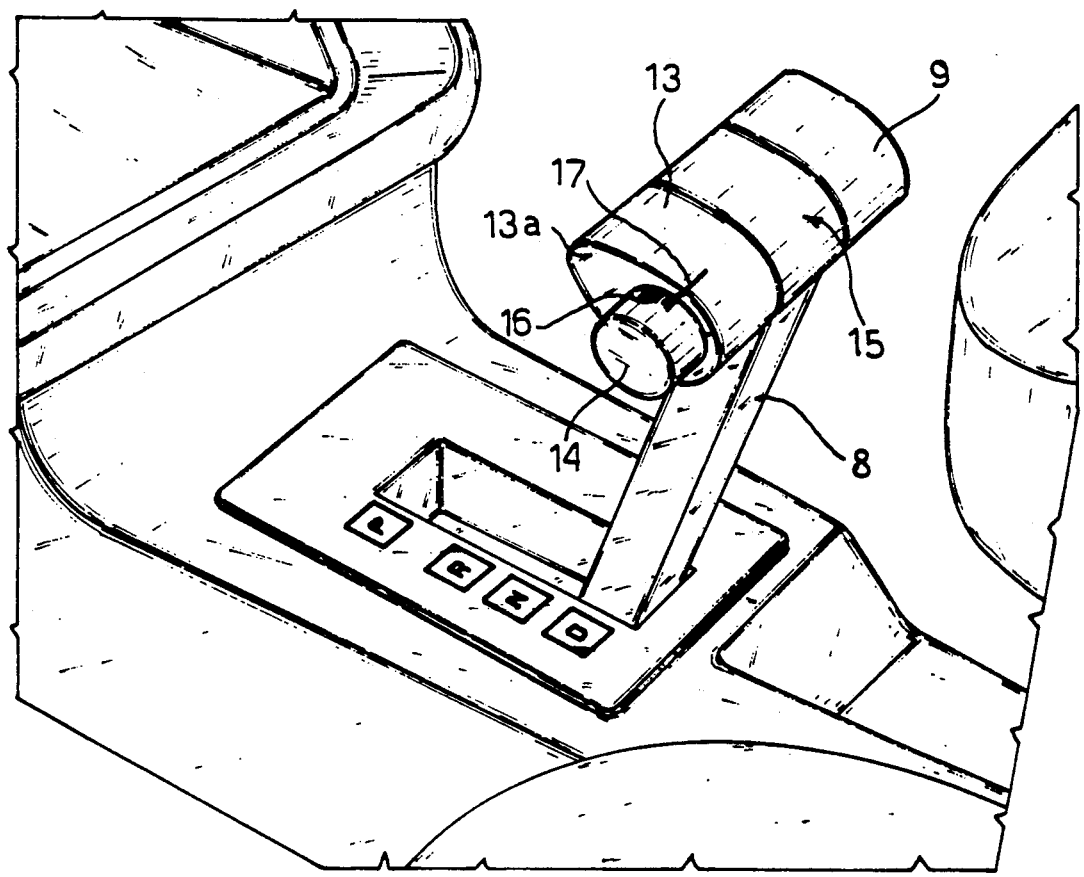

The control system according to the present invention is applicable to automatic transmissions comprising a variable-speed drive 1 for continuously varying the velocity ratio of an input shaft 2 and output shaft 3. Said variable-speed drive may be of any known type, for example, whereby drive is effected by means of a continuous flexible member, e.g. a belt, wound about a drive and a driven pulley. On a drive of this type, the velocity ratio is varied by modifying the radius by which the continuous flexible member is wound on to at least one of the pulleys. Drive 1 is activated by any type of actuator 4, e.g. an electrohydraulic actuator, controlled by an electronic control system 5 on the basis of engine and vehicle operating parameters supplied to control system 5 over an electric conductor 6. Control system 5 operates according to control strategies memorised inside the control system itself, whereby, for given values of the aforementioned parameters, signals are generated for controlling actuator 4 which in turn sets variable-speed drive 1 to a given velocity ratio.

The transmission also comprises a gear lever 8 with a number of settings, at least one of which enables actuator 4 to receive electric signals from control system 5 for activating variable-speed drive 1 as described previously.

Said setting of lever 8 is what is normally referred to as the "drive" setting, which corresponds to automatic control of variable-speed drive 1. Other known lever 8 settings may be: parking, neutral, reverse, and automatic drive control excluding the higher velocity ratios.

According to the present invention, the transmission also comprises an actuating member 9 located and operated manually on lever 8; a detector 11, for detecting the position of actuating member 9 and generating electric signals proportional to the same; and an electric circuit 12 (supposedly built into control system 5) for generating electric signals for controlling and setting actuator 4 to predetermined positions corresponding to velocity ratios of drive 1 proportional to said signals.

Figure 4:
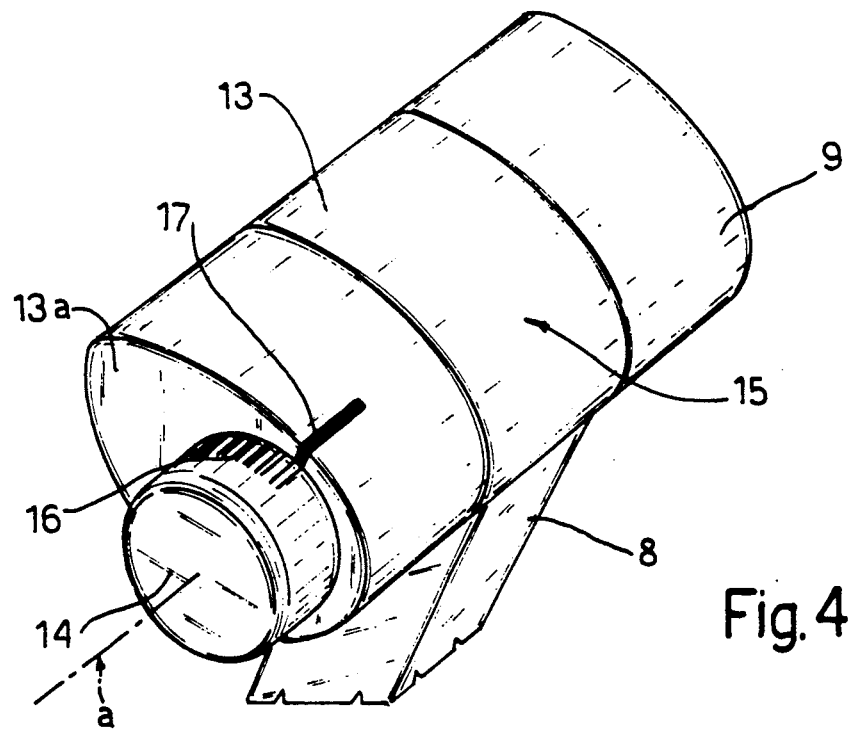
FIG. 4 shows a view in perspective of a detail on the FIG. 2 and 3 gear lever.

Actuating member 9 conveniently consists of grip 13 of gear lever 8, which also comprises a laterally-projecting cylindrical appendix 14, the axis of which ("a" in FIGS. 2, 3 and 4) is perpendicular to the operating plane of lever 8. Grip 13 rotates about axis "a", and is defined by an outer surface 15 off-centered in relation to axis "a", so as to produce an eccentric grip portion 13a as shown in the accompanying drawings.

Eccentric portion 13a of grip 13 conveniently faces the front of the vehicle, and outer surface 15 presents a substantially drop-shaped cross section perpendicular to axis "a".

The cylindrical surface of appendix 14 presents a scale 16 with which cooperates a mark 17 on grip 13 for indicating the angle of grip 13 in relation to appendix 14. Both scale 16 and mark 17 are so formed as to be readily visible across the driver's portion of the vehicle, for which purpose, they may be formed either in relief or slightly recessed in relation to the respective surfaces.

Setting detector 11 is conveniently located on lever 8 so as to generate electric signals for reducing the velocity ratio of variable-speed drive 1 when grip 13 is rotated so as to move eccentric portion 13a towards the driver. Thus, when grip 13 is rotated from the FIG. 2 or initial idle position to the FIG. 3 position corresponding to maximum travel of actuating member 9, detector 11 generates signals for reducing the velocity ratio between two predetermined values.

The transmission featuring the control system according to the present invention operates as follows.

When lever 8 is set to the "drive" position and actuating member 9 as shown in FIG. 2, i.e. with eccentric portion 13a facing downwards and towards the front of the vehicle, variable-speed drive 1 is controlled by actuator 4 solely on the basis of engine and vehicle operating parameters and according to the control strategy memorised in control system 5. When, on the other hand, appendix 14 is pressed and actuating member 9 rotated from the FIG. 2 to the FIG. 3 position, i.e. wherein eccentric portion 13a of grip 13 is turned towards the driver, actuator 4 is controlled via electric circuit 12 and on the basis of the signals generated by detector 11 relative to the position of actuating member 9. Each position of actuating member 9 corresponds to a predetermined value of the electric position signals sent to circuit 12 and, consequently, a predetermined value of the electric control signals generated by circuit 12 and sent to actuator 4. Thus, for each value of the latter signals, actuator 4 is set according to a predetermined velocity ratio of input shaft 2 and output shaft 3. Known means may be provided for ensuring lever 8 can only be set to the parking, reverse and "drive" positions by operating appendix 14. Electric circuit 12 and control system 5 may interact mutually in such a manner that, when actuating member 9 is set to other than said initial position, actuator 4 is controlled solely by electric circuit 12 as described, i.e. with no control signals generated by control system 5 for controlling actuator 4 on the basis of engine and vehicle operating parameters.

In addition to fully automatic control of the transmission, the control system according to the present invention therefore also enables the driver, via actuating member 9, to set the velocity ratios best suited for optimizing vehicle consumption and performance according to the operating conditions of the vehicle. What is more, engine braking by the driver is rendered far more effective, to do which, actuating member 9 need simply be rotated towards the driver for immediately shifting to the low velocity ratios. An important point to note in connection with the engine braking operation is that, consisting as it does in simply rotating grip portion 13a towards the driver, it may be performed instinctively and, therefore, extremely rapidly.

What is more, the velocity ratio set by rotating actuating member 9 is immediately perceptible, either visually or, if provision is made for the purpose, by simply feeling the position of mark 7 in relation to scale 16. Provision may of course be made for an optical indicator showing the velocity ratio set by rotating actuating member 9.

To those skilled in the art it will be clear that changes may be made to both the design and arrangement of the component parts of the embodiment described and illustrated herein without, however, departing from the scope of the present invention.

We claim:

1. An automatic transmission control system for cars, comprising:
   a variable-speed drive (1) enabling the velocity ratio of an input shaft (2) and an output shaft (3) to be varied continuously;
   said variable-speed drive (1) being activated by an actuator (4) controlled by an electronic control system (5) on the basis of engine and vehicle operating parameters;
   a gear lever (8) with a number of settings, at least one of which enables said actuator (4) to receive electric signals from said control system (5) for activating said variable-speed drive (1);
   an actuating member (9) located and operated manually on said gear lever (8), said actuating member (9 2) being movable independent of said gear lever (8)
   a detector (11) for detecting the setting of said actuating member (9) and generating electric signals proportional to the same; and,
   at least an electric circuit (12) operably associated with said detector (11) for generating electric signals for controlling and setting said actuator (4) to predetermined positions corresponding to velocity ratios of said variable-speed drive (1) proportional to said electric control signals.

2. A control system as claimed in claim 1, wherein:
   said actuating member (9) consists of a grip (13) of said gear lever (8).

3. A control system as claimed in claim 2, wherein:
   said lever (8) includes a cylindrical, laterally-projecting appendix (14) having its axis (a) perpendicular to the operating plane of said lever (8);
   said grip (13) rotating about said axis (a), and being defined by an outer surface (15) off-centered in relation to said axis (a), so as to produce an eccentric grip portion (13a) in relation to the same.

4. A control system as claimed in claim 3, wherein:
   said eccentric grip portion (13a) faces the front of the vehicle.

5. A control system as claimed in claim 4, wherein:
   said position detector (11) is so arranged as to generate electric signals for reducing said velocity ratio when said grip (13) is rotated so as to bring said eccentric portion (13a) towards the driver of the vehicle.

6. A control system as claimed in claim 3, wherein:
   said outer surface (15) of said grip (13) includes a substantially drop-shaped section perpendicular to said axis (a).

7. A control system as claimed in claim 1, wherein:
   said lever (8) includes a cylindrical laterally projecting appendix (14), the cylindrical appendix (14) includes a scale (16) with which cooperates a mark (17) on said grip (13) for indicating the position of said grip (13) in relation to said appendix (14).

8. A control system as claimed in claim 7, wherein:
   at least one of said scale (16) and said mark (17) are so formed on said appendix (14) and said grip (13) as to be perceptible over the driver's portion of the vehicle.

9. An automatic control system for cars, comprising:
   a variable-speed drive (1) enabling the velocity ratio of an input shaft (2) and an output shaft (3) to be varied continuously;
   said variable-speed drive (1) being activated by an actuator (4) controlled by an electronic control system (5) on the basis of engine and vehicle operating parameters;
   a gear lever (8) with a number of settings, at least one setting enables said actuator (4) to receive electrical signals from said control system (5) for activating said variable-speed drive (1); and,
   an actuating member (9) operably associated with said actuator (4), said actuating member (9) being mounted on and movable independent of said gear levers (8) thereby permitting a driver to manually adjust said variable-speed drive.

* * * * *